(12) United States Patent
Morgan et al.

(10) Patent No.: US 10,517,305 B2
(45) Date of Patent: Dec. 31, 2019

(54) FOOD PAN HAVING REINFORCED BAND

(71) Applicant: The Vollrath Company, L.L.C., Sheboygan, WI (US)

(72) Inventors: Steven P. Morgan, Plymouth, WI (US); Bruce J. Keller, Campbellsport, WI (US)

(73) Assignee: The Vollrath Company, L.L.C., Sheboygan, WI (US)

( * ) Notice: Subject to any disclaimer, the term of this patent is extended or adjusted under 35 U.S.C. 154(b) by 429 days.

(21) Appl. No.: 15/365,167

(22) Filed: Nov. 30, 2016

(65) Prior Publication Data

US 2018/0146684 A1    May 31, 2018

(51) Int. Cl.
*A21B 3/13*    (2006.01)
*F24C 15/16*    (2006.01)

(52) U.S. Cl.
CPC .............. *A21B 3/136* (2013.01); *F24C 15/16* (2013.01)

(58) Field of Classification Search
CPC ........ A21B 3/136; A21B 3/133; A47J 27/002; B65D 2581/3406; B65D 1/40
See application file for complete search history.

(56) References Cited

U.S. PATENT DOCUMENTS

| 189,250 | A |   | 4/1877 | Milligan |
| 880,834 | A |   | 3/1908 | Stollberg |
| 911,084 | A |   | 2/1909 | Stollberg |
| 1,555,294 | A |   | 9/1925 | Kempter |
| 1,599,446 | A |   | 9/1926 | Wege |
| 1,707,655 | A | * | 4/1929 | Cohn ........................ A21B 3/13 126/39 M |
| 1,764,685 | A |   | 6/1930 | Kollman |
| 1,799,205 | A | * | 4/1931 | Wood ..................... A47J 27/002 220/641 |
| 1,876,701 | A |   | 9/1932 | Lemmon |
| 1,965,647 | A |   | 7/1934 | Jackson |
| 1,974,186 | A | * | 9/1934 | Kollman ................. A21B 3/134 126/390.1 |
| 2,081,925 | A |   | 6/1937 | Graf |
| 2,097,899 | A |   | 11/1937 | Smith |
| 2,104,686 | A |   | 1/1938 | Wood |
| 2,182,454 | A |   | 12/1939 | Sherman |
| 2,484,271 | A |   | 10/1949 | Coyle |
| 2,605,929 | A | * | 8/1952 | Samuel .................... B65D 1/40 126/373.1 |
| 2,656,947 | A |   | 10/1953 | Stevenson |
| 3,229,886 | A |   | 1/1966 | Grogel |
| 3,233,813 | A |   | 2/1966 | Wolford et al. |
| 3,448,891 | A |   | 6/1969 | Czarnecki |
| 3,545,645 | A |   | 12/1970 | Smith et al. |

(Continued)

*Primary Examiner* — Shawn M Braden
(74) *Attorney, Agent, or Firm* — Foley & Lardner LLP (57) ABSTRACT

A method for making a food pan including forming a pan including a bottom, and a side wall extending along a perimeter of the bottom, wherein the side wall comprises an upper perimeter. The method includes forming a rim around the upper perimeter of the side wall, wherein the rim comprises a top portion and an outer edge, providing a reinforcement band proximate the upper perimeter of the side wall and the rim, and bending the rim around the reinforcement band, wherein the outer edge of the rim contacts the side wall when fully shaped. The method further includes reforming a shape of the reinforcement band and the rim.

20 Claims, 13 Drawing Sheets

(56) References Cited

U.S. PATENT DOCUMENTS

| | | | |
|---|---|---|---|
| 3,695,084 A | 10/1972 | Siemonsen et al. | |
| 3,850,340 A | 11/1974 | Siemonsen et al. | |
| 4,029,232 A | 6/1977 | Mania | |
| 4,049,122 A | 9/1977 | Maxwell | |
| 4,216,241 A | 8/1980 | Thompson | |
| 4,296,682 A | 10/1981 | Thompson | |
| 5,361,687 A | 11/1994 | Devries | |
| 7,282,532 B2 | 10/2007 | Akbar et al. | |
| 7,517,933 B2 | 4/2009 | Holmes et al. | |
| 7,540,394 B2 | 6/2009 | Brasset | |
| 7,997,439 B2 | 8/2011 | Meeks et al. | |
| 8,348,089 B2 * | 1/2013 | Tingley | A47J 37/01 220/641 |
| 2002/0171027 A1 | 11/2002 | Martellato et al. | |
| 2009/0223977 A1 * | 9/2009 | Cheng | A47J 27/002 220/573.1 |

* cited by examiner

FOOD PAN HAVING REINFORCED BAND

BACKGROUND

The present invention relates generally to the field of food pans for cooking and serving purposes. More specifically, the present invention relates to food pans having a reinforced band structure.

SUMMARY

One embodiment of the invention relates to a method of making a food pan. The method includes forming a pan comprising a bottom, a side wall extending along a perimeter of the bottom, wherein the side wall includes an upper perimeter, and forming a rim around the upper perimeter of the side wall, wherein the rim comprises a top portion and an outer edge. The method further includes providing a reinforcement band proximate the upper perimeter of the side wall and the rim and bending the rim around the reinforcement band, wherein the outer edge of the rim contacts the side wall when fully shaped. The method further includes reforming a shape of the reinforcement band and the rim.

Another embodiment of the invention relates to a food pan. The food pan includes a bottom, a side wall extending along a perimeter of the bottom and including an upper perimeter, a reinforcement band proximate the upper perimeter of the side wall, and a rim extending from the side wall to an outer edge engaging the side wall to define an enclosed interior space. The rim includes a top side and an underside. The top side and the underside surround the reinforcement band within the enclosed interior space and the outer edge engages the side wall to enclose the reinforcement band, where a shape of the reinforcement band and the rim are reformed by a coining operation.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring to FIGS. 1-5, a food pan 110 is shown according to an exemplary embodiment. The food pan 110 includes a bottom (wall) 112, a side wall 114 connected to and extending upward from the bottom 112, and a rim 116 connected to and extending outward from the side wall 114. Between the side wall 114 and the rim 116, the food pan 110 further includes a band 118 designed to strengthen and reinforce the rim 116 and side wall 114 (e.g., against warping, bending, denting, flexing, etc.). Together, the rim 116 and the band 118 form a reinforced band assembly 120. The reinforced band assembly 120 is configured to be sealed against any liquid penetration, as discussed further herein. In some embodiments, the reinforced band assembly 120 may further be configured to facilitate easy storage of the food pan 110 in storage equipment.

Figure 1:
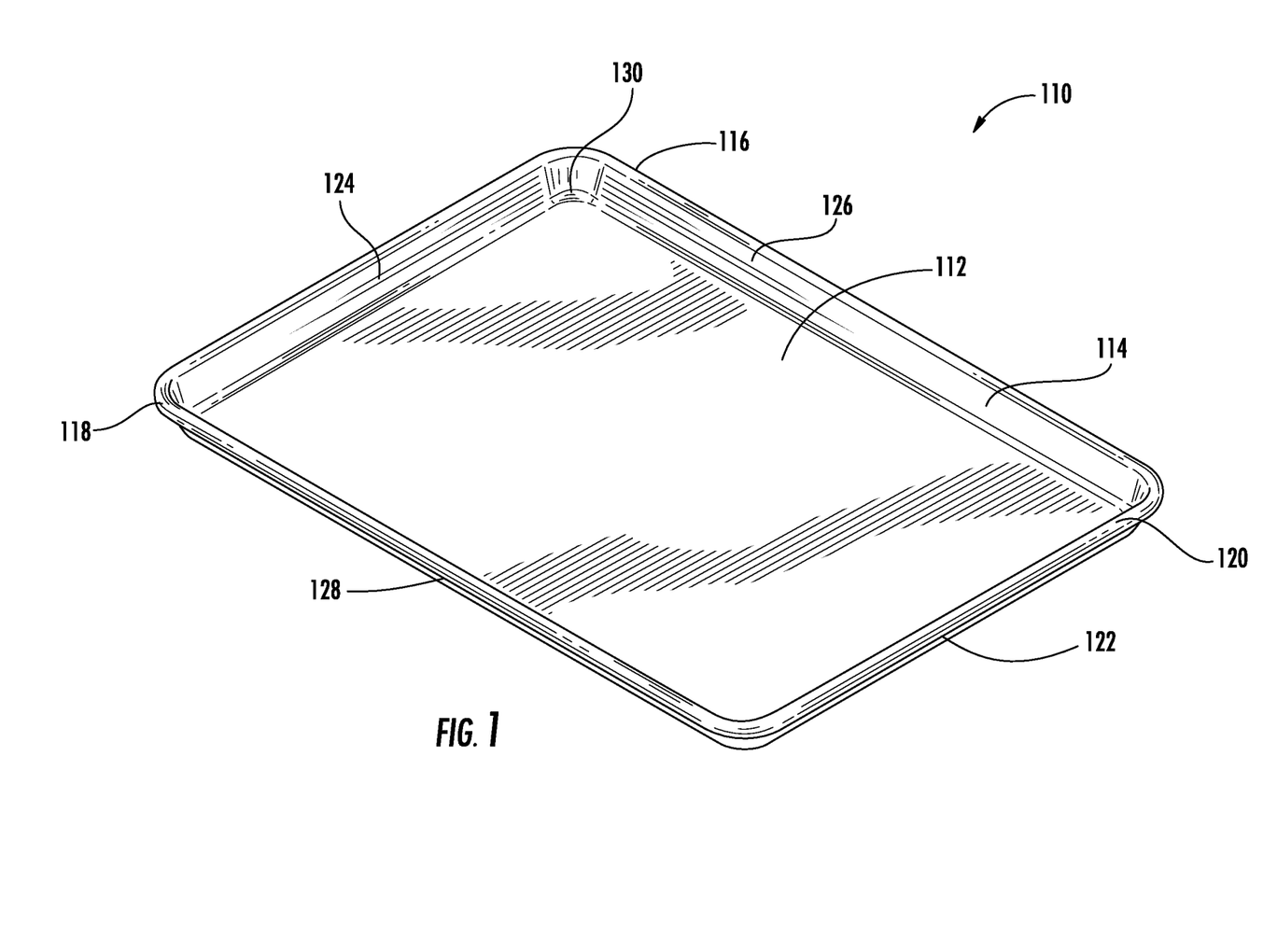
FIG. 1 is a perspective view of a food pan, according to an exemplary embodiment.
Figure 2:
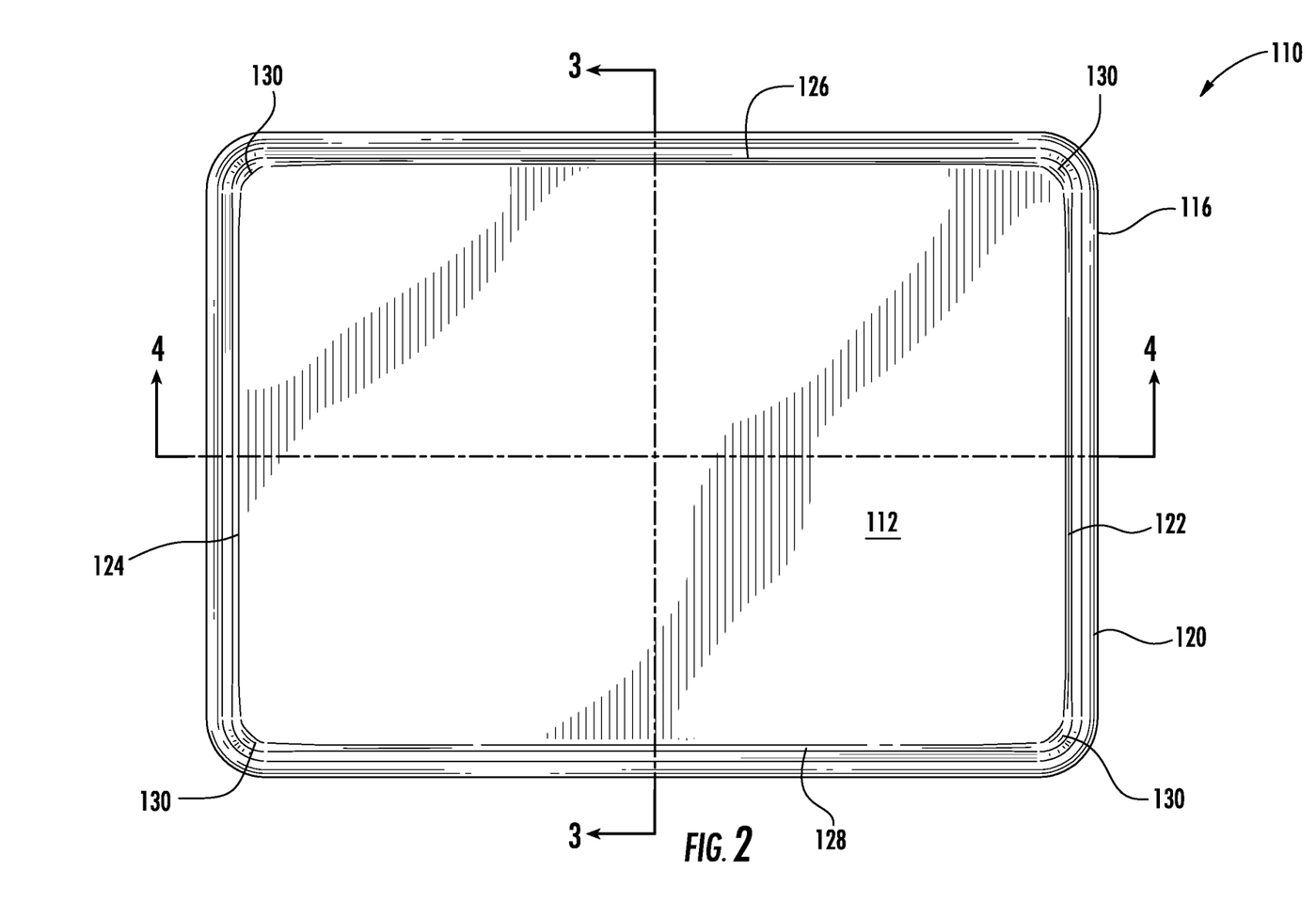
FIG. 2 is a top view of the food pan of FIG. 2, according to an exemplary embodiment.

Referring to FIGS. 1-2, according to an exemplary embodiment, the bottom 112 of the food pan 110 includes a substantially rectangular perimeter, which includes a first two sides 122, 124 (e.g., left and right) that are perpendicular to a second two sides 126, 128 (e.g., front and back). According to an exemplary embodiment, the first sides 122, 124 intersect the second sides in rounded corners 130 (i.e., rounded about a vertical axis). In some embodiments the bottom 112 is flat, while in other contemplated embodiments the bottom 112 of the food pan 110 may include partitioning structure, slope, or is otherwise contoured (e.g., contoured with ridges, grooves, perforations).

Figure 3:
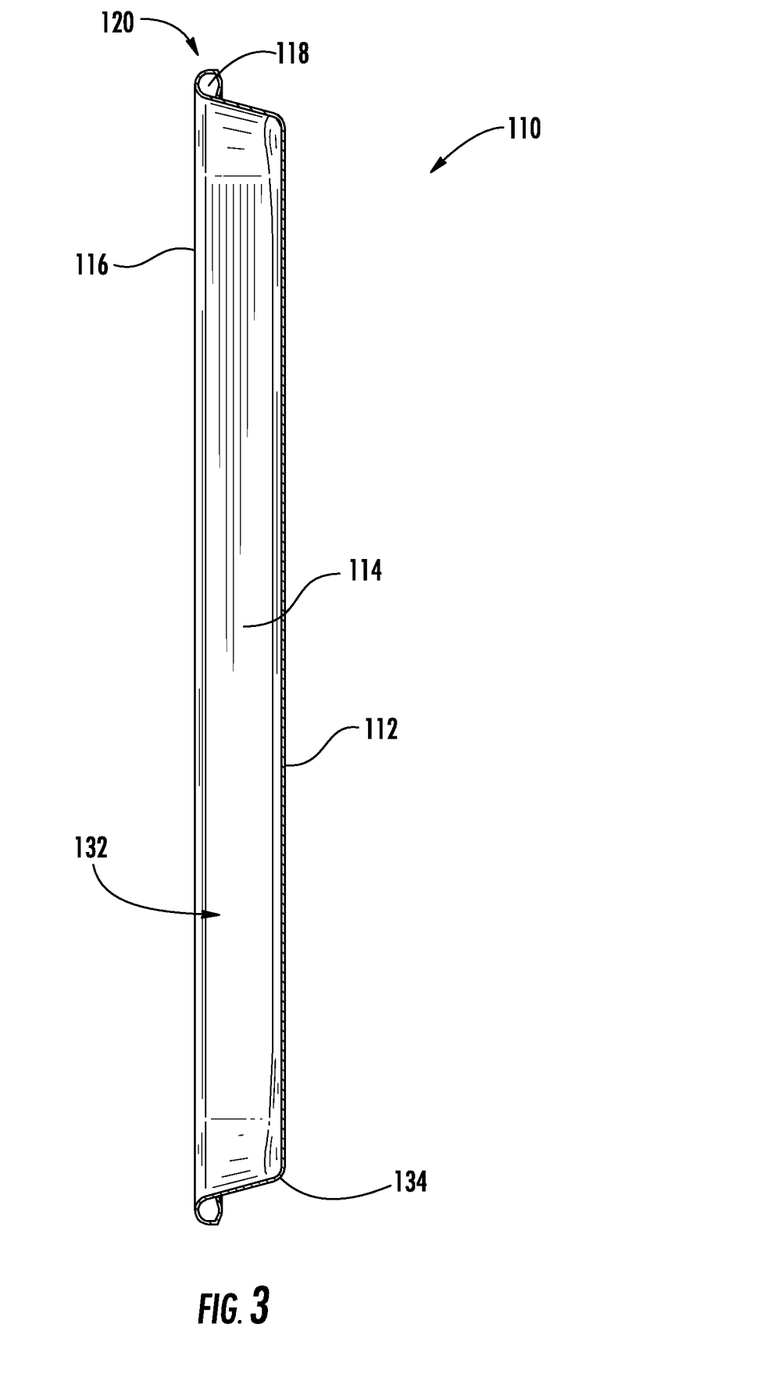
FIG. 3 is a section view of the food pan of FIG. 2 taken along line 3-3, according to an exemplary embodiment.
Figure 4:
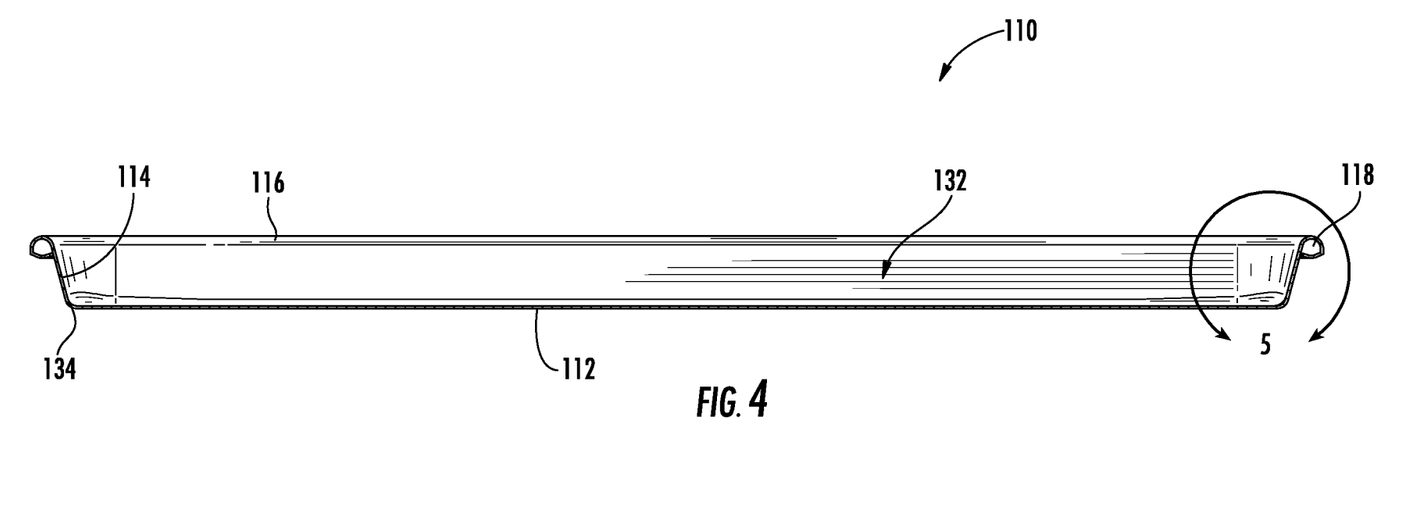
FIG. 4 is a section view of the food pan of FIG. 2 taken along line 4-4, according to an exemplary embodiment.

Referring to FIG. 3-4, the side wall 114 is connected to (e.g., integral with) the bottom 112 of the food pan 110. FIG. 3 shows an end side (one of sides 122, 124) of the food pan 210 and FIG. 4 shows a longer side (one of sides 126, 128). Together the side wall 114 and the bottom 112 form a volume 132 for supporting the contents of the food pan 110. According to an exemplary embodiment, the side wall 114 is connected to the bottom 112 by way of a rounded corner 134 (i.e., rounded about a horizontal axis). Rounding the corner 134 between the side wall 114 and the bottom 112 of the food pan 110 allows for easier cleaning of the food pan 110 by widening an otherwise hard-to-reach corner 134.

Figure 5:
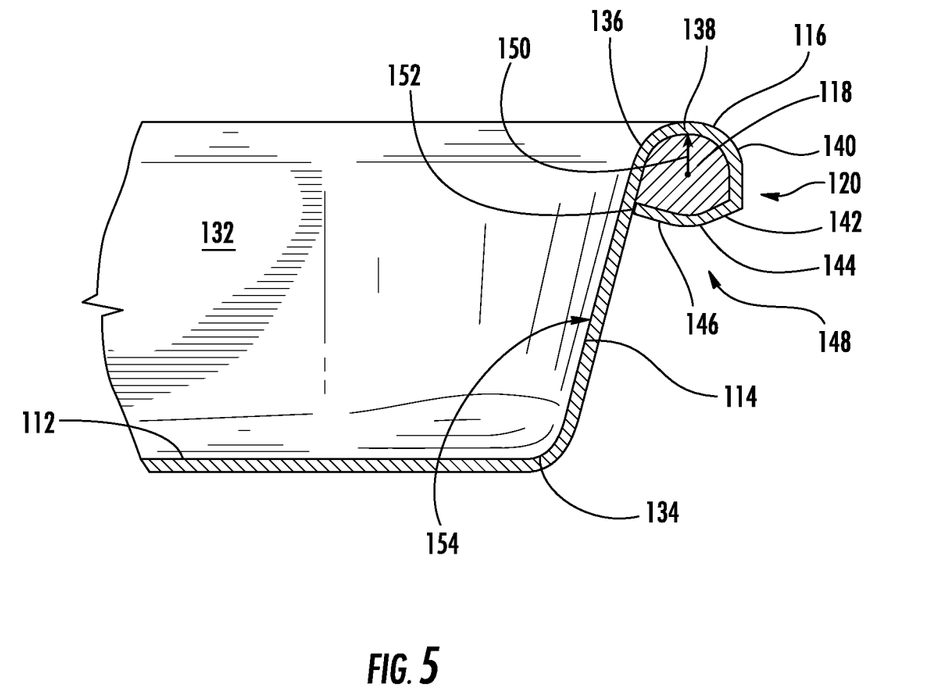
FIG. 5 is a detailed view of section 5 of the food pan of FIG. 4, according to an exemplary embodiment.

According to an exemplary embodiment, the side wall 114 extends upward from the rectangular perimeter of the bottom 112. As shown in FIG. 5, in some embodiments, the side wall 114 is substantially perpendicular to the bottom 112, and may be angled slightly outward from the bottom 112 while extending toward the rim 116. In some such embodiments, the side wall 114 is angled between about 90 to 110 degrees relative to the bottom 112 of the food pan 110. In other embodiments, the side wall 114 is angled more than 110 degrees relative to the bottom 112 of the food pan 110. The food pan 110 can be narrower, wider, shorter, longer, deeper, and/or shallower than the embodiment shown in FIGS. 2-4. In other contemplated embodiments, a non-rectangular food pan includes one or more sides having a band structure as described herein. In some embodiments, a circular (or oblong) food pan may include the band structure described herein.

Referring now to FIG. 5, according to an exemplary embodiment, the bottom 112 of the food pan 110 is generally flat and defines a first horizontal plane. In some embodiments, the bottom 112 of the food pan 110 includes a concave portion such that when the food pan 110 stretches after use, the food pan 110 will contact a resting surface at more than one point on the bottom 112, keeping the food pan 110 stationary on the surface. The horizontal plane of the bottom 112 extends into a tangent of the corner 134 formed between the bottom 112 and the side wall 114. The side wall 114 extends tangentially from the corner 134 in a direction substantially perpendicular (e.g., within 20 degrees of perfectly perpendicular) to the horizontal plane. As such, in some embodiments the side wall 114 includes four substantially flat surfaces defining approximate vertical planes, two planes defined by the side wall 114 on the sides 122, 124 of the food pan (see FIG. 4) and two planes defined by the side wall 114 on the sides 126, 128 of the food pan (see FIG. 5). In other embodiments, side wall 114 is not substantially perpendicular to the bottom 112, but is instead angled with respect thereto by at least more 100 degrees.

Referring to FIG. 5, the rim 116 extends in a hook-shaped contour away from the side wall 114. In some such embodiments, the rim 116 includes an ascending portion 136 (connected to the side wall 114), a top portion 138 (connected to the ascending portion 136), a descending 140 portion (connected to the top portion 138), and a bottom portion 148 (connected to descending portion 140 and engaged with sidewall 114). The ascending portion 136, (at least a portion of) descending portion 140, and top portion 138 form a rounded portion with a radius of curvature 150. In some embodiments, the rounded portion is non-circular and has a radius of curvature that varies as a function of distance from the side wall 114 or otherwise varies. Rounding the rim 116 forming the ascending, descending, and top portions 136, 138, 140 provides strength to the reinforced band assembly 120, such as by providing a cross-sectional structure able to redistribute loading received by the rim 216 from a wide range of impact directions.

The descending portion 140 extends tangentially downward from the top portion 138 to the bottom portion 148. The bottom portion 148 extends inward toward the side wall 114 from the descending portion 140 to an end 152 of the rim 116 that and engages the side wall 114. The bottom portion 148 includes an outer portion 142 extending from the descending portion 140 to a middle portion 144 and an inner portion 146 extending between the middle portion 144 to the end 152. In an exemplary embodiment, the middle portion 144 forms a single point of contact on the bottom portion 148 of the rim 116 along a perimeter of the food pan 110. In such an embodiment, the middle portion 144 is configured to facilitate sliding of the food pan 110 along the rim 116 in and out of a food pan rack or other storage and/or cooking equipment, where the middle portion 144 contacts the equipment on a single point along the rim 116. The single point of contact provides less friction between the rim 116 and a sliding surface of a rack or other storage, cleaning, or cooking equipment. In other embodiments, the middle portion 144 can be flat, rounded, or otherwise shaped. During a manufacturing process of the food pan 110, the rim 116, particularly the bottom portion 148, is crushed around (e.g., forged, coined, formed around) the band 118 inserted between the rim 116 and the side wall 114, as described further herein. Thus, the ultimate shape of the bottom portion 148 is defined by the deformation of the band 118 as the band 118 is crushed (e.g., coined, formed, deformed, reshaped, changed, modified, transformed, reformed, altered, converted, etc.) in between the rim 116 and the side wall 114.

Referring still to FIG. 5, the band 118 (e.g., reinforcement structure) of the food pan 110 is intended to reinforce the rim 116. According to an exemplary embodiment, the band 118 is positioned between the side wall 114 and the rim 116. The rim 116 and band 118 are crushed (e.g., curled, coined, forged, formed, reshaped, changed, modified, transformed, reformed, altered, converted, etc.) such that the end 152 of the rim 116 is flush against and engaging the side wall 114. The crushing process transforms the shape of the band 118 so that it fills in (and takes the shape of) the space defined by the rim. The crushing method used to transform the shape of the band 118 in between the rim 116 and the side wall 114 is intended to provide a reinforced band assembly 120 without any space (e.g., air, gap, void, separation, etc.) between the rim and band 118, intending to provide a debris-tight seal. The end 152 of the rim 116 and the side wall 114 are tightly sealed such that no debris (e.g., liquids, solids) can pass between the rim 116 and the side wall 114. In an exemplary embodiment, an inner wall 154 of the side wall 114 is not deformed in any way during the crushing process described above. This forming of the shape of the rim 116 and reinforcement band 118 (e.g., deforming, reshaping, shape changing, modifying, transforming, reforming, altering, converting, etc.) by the crushing process (e.g., coining, forging, etc.) is in contrast to known pans that form the rim to the shape of the reinforcement band (which leaves gaps between the rim and the side wall and gaps between the reinforcement band and rim).

According to an exemplary embodiment, the food pan 110 and the band 118 are formed from a material that has specific strength and malleability properties (e.g., aluminum or aluminum alloys). In other embodiments, the food pan 110 and band 118 can be formed from a material with similar properties as aluminum. Forming the band 118 from such a material provides malleability of the band 118 for crushing (e.g., coining, forming, forging, reshaping, changing, modifying, transforming, reforming, altering, converting, etc.) processes such that no gaps are left between the band 118, side wall 114 and rim 116. Using a malleable material in the crushing process can generate dislocations in the grain structure of the material (e.g., by cold working, forging, etc.), which in turn strengthens the material. Thus, the food pan 110 and band 118 include a relatively high strength of material such that the reinforced band assembly 120 will endure continuous use without deformation. The material is additionally relatively lightweight, thereby facilitating easy transport of the food pan 110 and further reducing the likelihood of deformation of the reinforced band assembly 120 upon dropping the food pan 110. The material exhibits thermal properties with the ability to withstand significant heat (e.g., up to approximately 1200 degrees Fahrenheit), the ability to efficiently transfer heat, and the ability to withstand warping of the food pan 110 during temperature fluctuations (e.g., inserting the food pan 110 into a pre-heated oven). In an exemplary embodiment, the material has a modulus of elasticity within the range of 65 gigapascals (GPa) and 75 GPa, a density within the range of 2.65 grams/centimeter cubed (g/cm$^3$) to 2.75 g/cm$^3$, and a tensile strength of at least 30,000 lb/in$^2$ (psi). Further, the material is corrosion resistant and relatively low cost.

Referring to FIGS. 6-18, an exemplary manufacturing process of the food pan 110 is shown in progressive stages. A process for forming the food pan 110 includes providing an individual sheet or a roll of metal, sheering or cutting a desired size blank, conducting a first draw of the blank, annealing the metal, conducting a second draw, trimming and deburring the food pan 110, crushing the rim 116 of the food pan 110 around a reinforced band 118 to create a reinforced band assembly 120, and washing and packaging the food pan 110. Other exemplary embodiments include some, but not all of these steps or processes.

Figure 6:
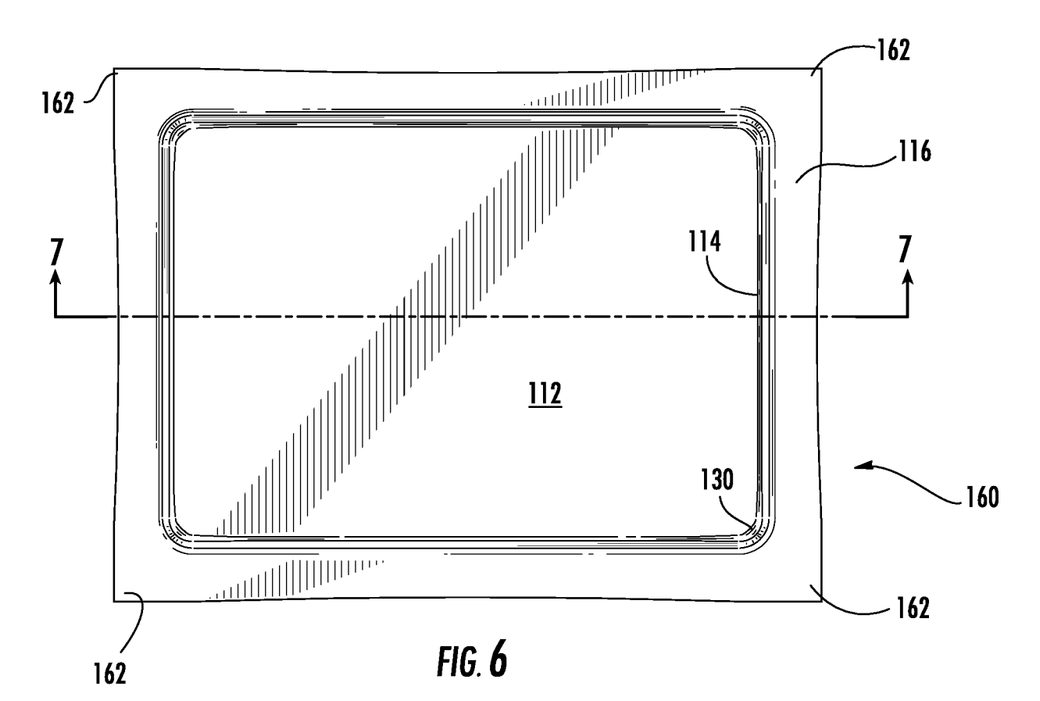
FIG. 6 is a top view of the food pan during a manufacturing process, according to an exemplary embodiment.
Figure 7:
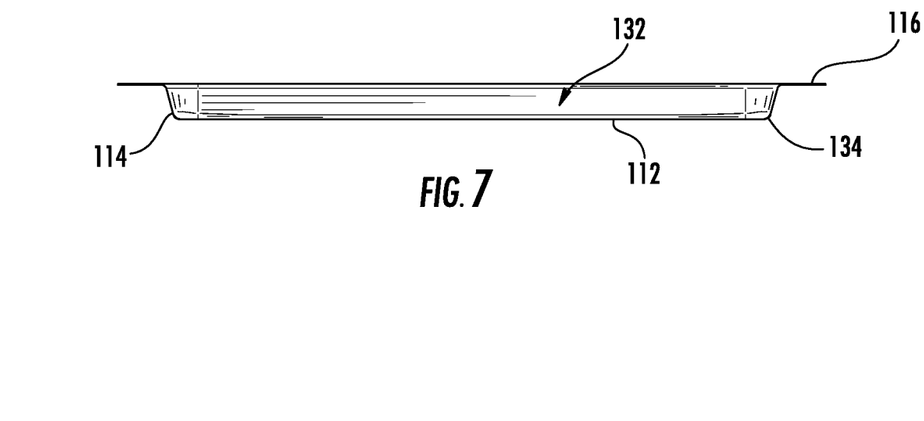
FIG. 7 is a section view of the food pan of FIG. 6 taken along line 7-7, according to an exemplary embodiment.
Figure 8:
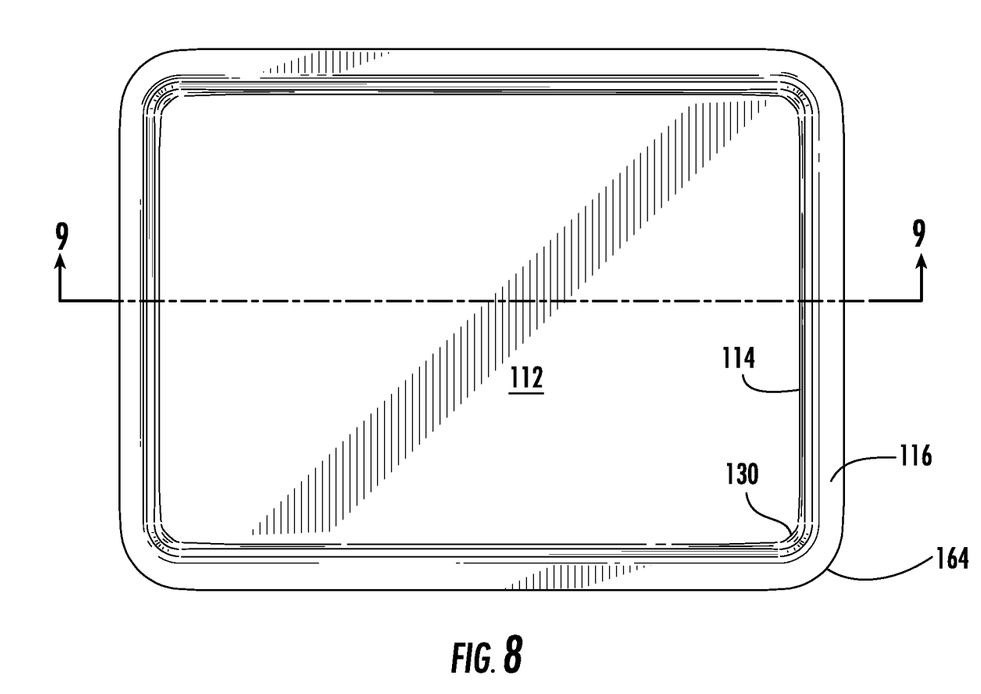
FIG. 8 is a top view of the food pan during a manufacturing process, according to an exemplary embodiment.
Figure 9:
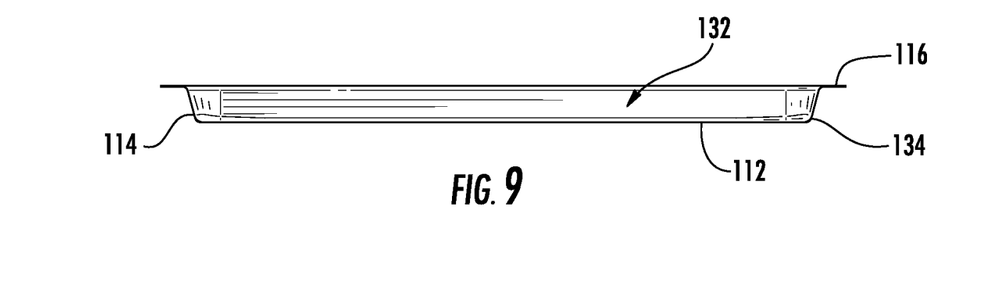
FIG. 9 is a section view of the food pan of FIG. 8 taken along line 9-9, according to an exemplary embodiment.

As shown in FIGS. 6-7, the drawn sheet 160 is in a substantially rectangular shape, with rim 116 extending to corners 162, which are substantially perpendicular to each other. As shown in FIG. 7, in the first step in the manufacture of the food pan 110, the rim 116 extends outward substantially parallel to the horizontal plane formed by the bottom 112. Turning to FIGS. 8-9, the sheet 160 is trimmed and deburred forming rounded corners 164. The sheet 160 is trimmed and shaped at the corners 164 such that when rim 116 is crushed (e.g., coined, formed, forged, reshaped, changed, modified, transformed, reformed, altered, converted, etc.) around the band 118 and against the side wall 114, the corners 164 of the rim 116 form a debris-tight seal such that no food or liquid can penetrate the seal.

Figure 10:
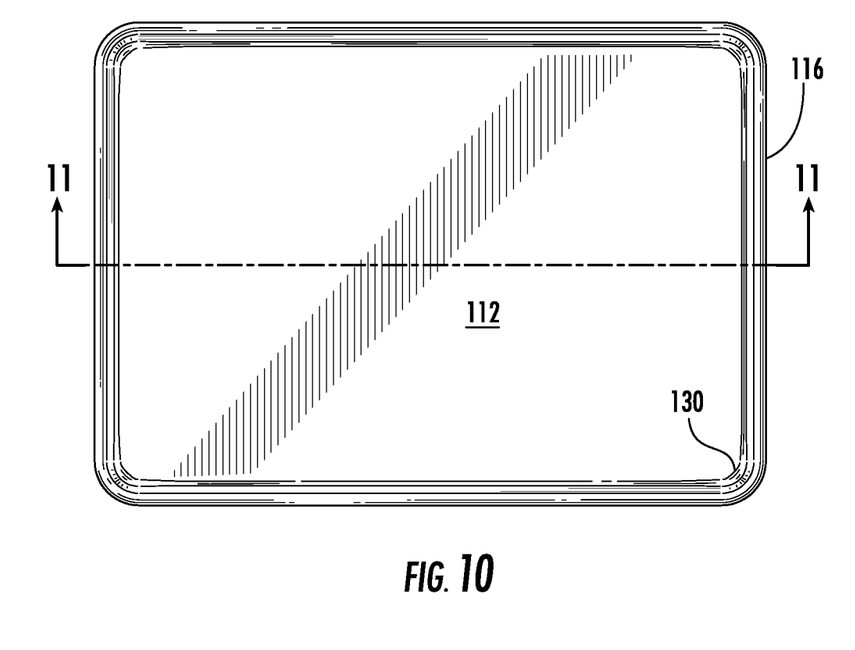
FIG. 10 is a top view of the food pan during a manufacturing process, according to an exemplary embodiment.
Figure 11:
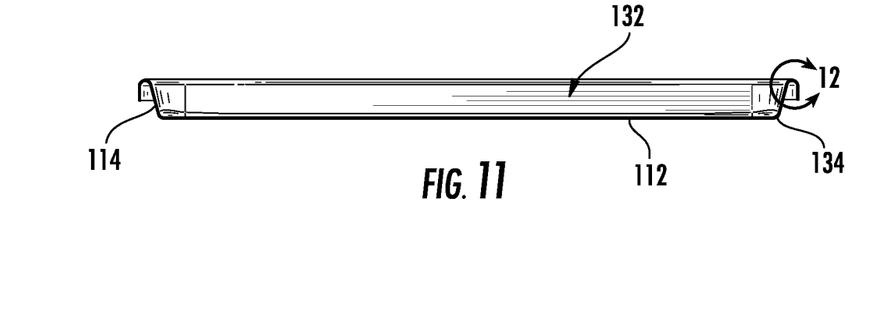
FIG. 11 is a section view of the food pan of FIG. 10 taken along line 11-11, according to an exemplary embodiment.
Figure 12:
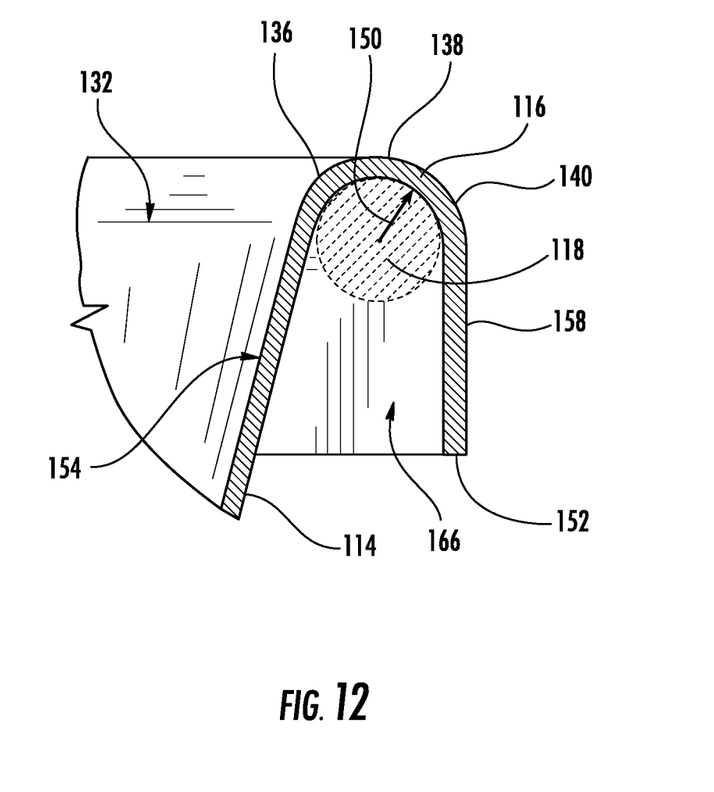
FIG. 12 is a detailed view of section 12 of the food pan of FIG. 10, according to an exemplary embodiment.
Figure 13:
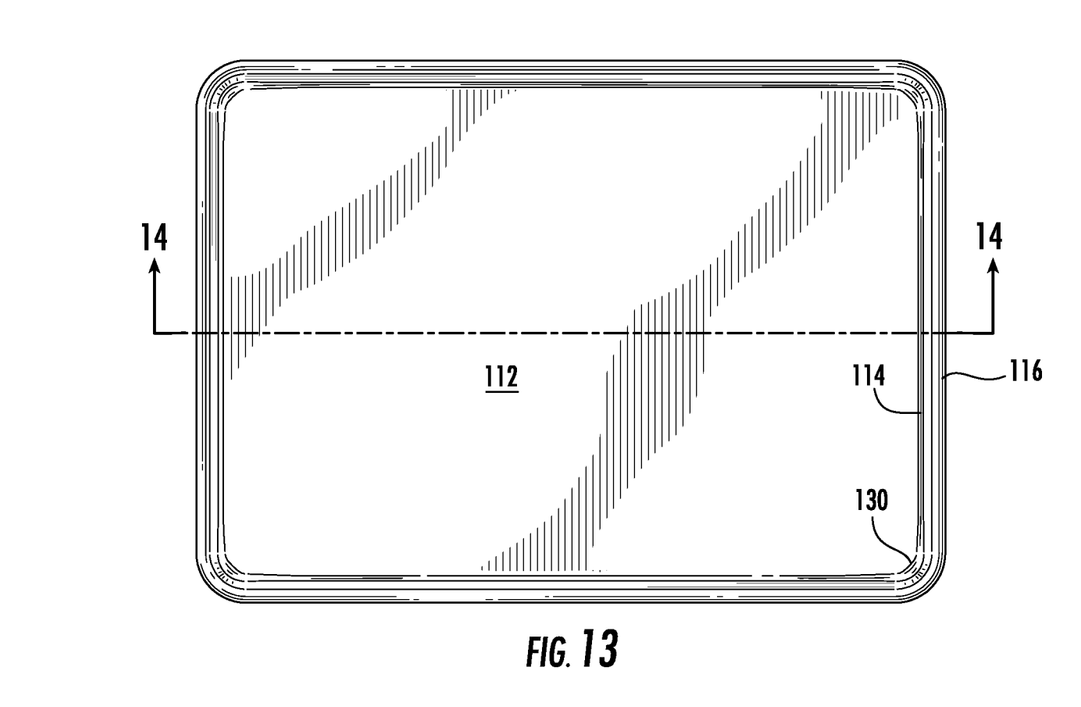
FIG. 13 is a top view of the food pan during a manufacturing process, according to an exemplary embodiment.
Figure 14:
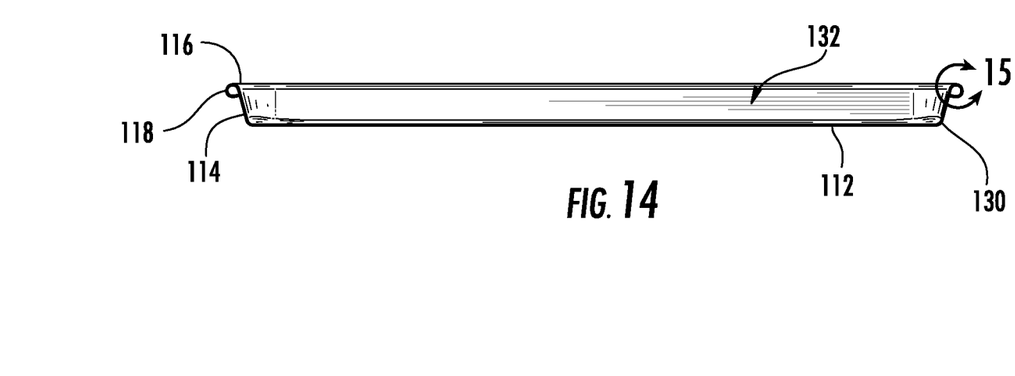
FIG. 14 is a section view of the food pan of FIG. 13 taken along line 14-14, according to an exemplary embodiment.

Referring to FIGS. 10-12, next, the rim 116 is bent downward such that the rim 116 extends in a hook-shaped contour away from the side wall 114. In this stage of the manufacture process, the rim 116 includes the ascending portion 136, top portion 138, and descending portion 140 as described in regard to FIG. 5. The ascending portion 136, top portion 138, and descending portion 140 form a rounded curvature with radius of curvature 150. The descending portion 140 extends downward into a vertical surface 158. The vertical surface 158 extends vertically downward substantially perpendicular to the horizontal plane defined by the bottom 112 of the food pan 110. As mentioned above, in an exemplary embodiment, the inner wall 154 of the food pan 110 is not deformed during this process.

Figure 15:
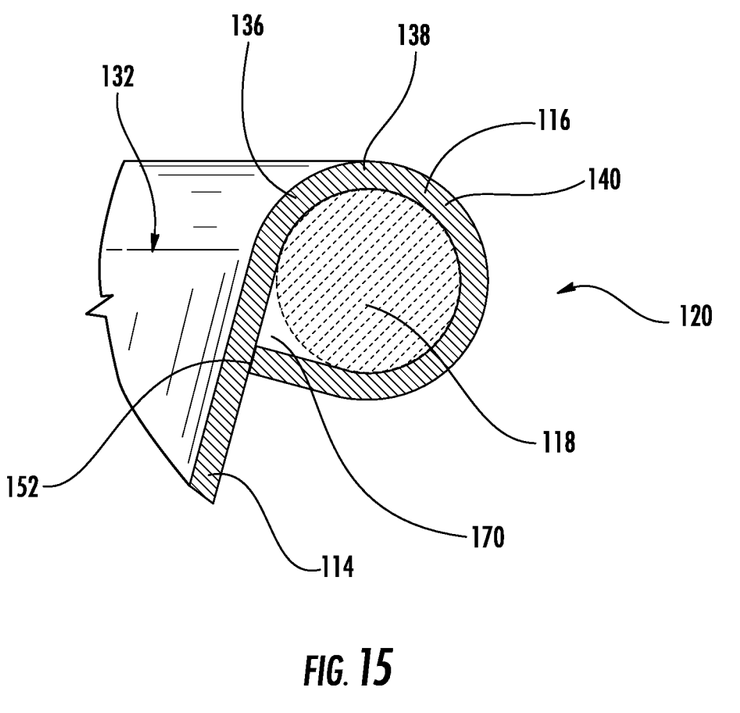
FIG. 15 is a detailed view of section 15 of the food pan of FIG. 13, according to an exemplary embodiment.

Referring to FIGS. 12-15, the band 118 is then inserted in between the side wall 114 and the rim 116. The band 118 is formed from a tubular-shaped material processed through a coil bending machine and cut to length. The resulting ends of the material are butted together prior to insertion of the band 118 into the gap 166 between the side wall 114 and the rim 116. The band 118 is inserted while the food pan 110 is upside-down. With the food pan 110 resting on the rim 116 in an upside-down position, the vertical surface 158 extends upward such that gap 166 is visible. The band 118 is inserted within the gap 166 along the perimeter of the food pan 110. As shown in FIG. 15, the rim 116 is then curled around the band 118 until the end 152 is contacting the side wall 114. The end 152 of the rim 116 may extend past horizontal to contact the side wall 114 such that the angle between the flat surface of the end 152 and the side wall 114 is substantially perpendicular. In this way, the end 152 fully contacts the side wall 114. As shown in FIG. 15, prior to a crushing (e.g., coining, forging, forming, reshaping, changing, modifying, transforming, reforming, altering, converting, etc.) process described in regard to FIGS. 16-18, an air gap 170 may be formed between the rim 116, the side wall 114, and the band 118.

Figures 16, 17:
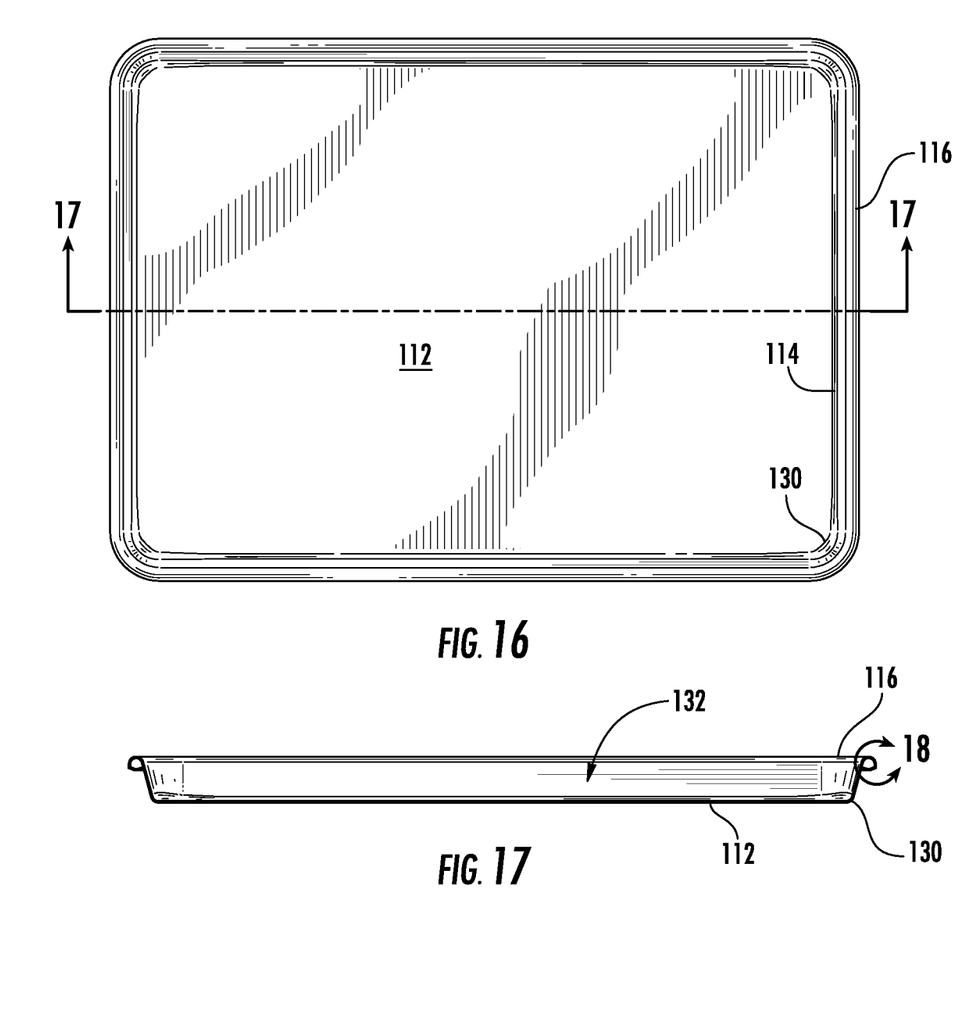
FIG. 16 is a top view of the food pan during a manufacturing process, according to an exemplary embodiment.
FIG. 17 is a section view of the food pan of FIG. 16 taken along line 17-17, according to an exemplary embodiment.
Figure 18:
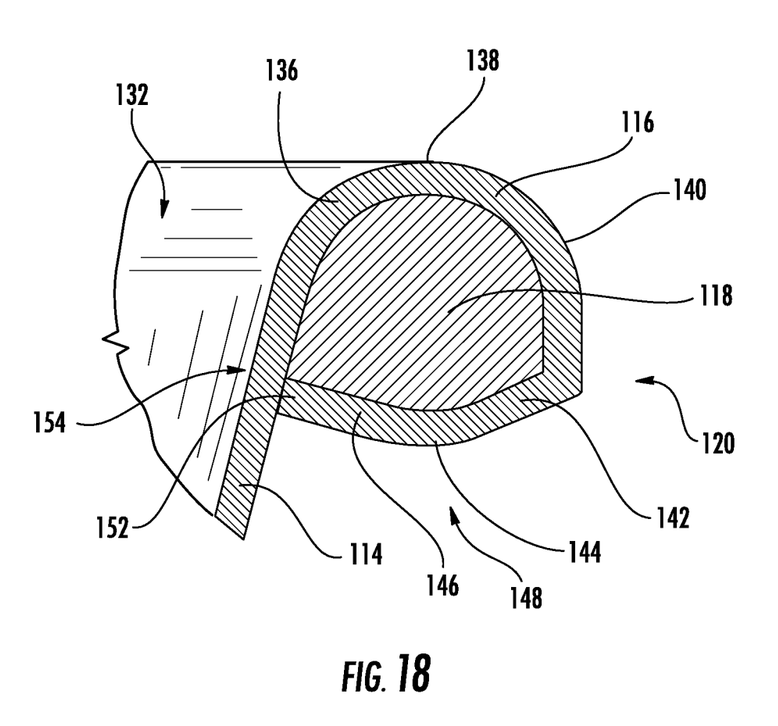
FIG. 18 is a detailed view of section 18 of the food pan of FIG. 16, according to an exemplary embodiment.

Turning to FIGS. 16-18, the rim 116 is crushed (e.g., coined, formed, forged, reshaped, changed, modified, transformed, reformed, altered, converted, etc.) around the band 118 to create a debris-tight seal and eliminate the air gap 170 shown in FIG. 15. To complete the crushing process, a crushing machine is used. As shown in FIG. 18, the rim 116 encloses the band 118 completely within the gap 166 (shown in FIG. 12). After the crushing process, there is no air gap between the band 118, side wall 114 or rim 116. The crushing process conforms the band 118 to a desired shape (e.g., including middle portion 144 providing a single point of contact). The crushing process additionally conforms the end 152 to the side wall 114 such that no debris or fluids can enter the reinforced band assembly 120. According to an exemplary embodiment, the process includes a forging process (e.g., a closed die forging process). For example, the process involves a coining (closed die forging) process in which pressure is applied on the upper surface of the forging (e.g., the portion that forms the rim) by shaped dies (e.g., two shaped dies) to obtain the desired shape, tolerances, surface smoothness, and draft. Pressure may be applied to a portion or the entire surface of a rim such that the metal work piece is subjected to high stress to induce plastic deformation in the shape of the die(s).

In some contemplated applications, over the course of the life of the food pan, the food pan 110 may be used with food and/or liquid contents. Using conventional food pans, food particles and/or liquids that contact the underside of the food pan may get trapped within a gap formed between the rim and side wall of the food pan resulting in possible unsanitary conditions and/or hard-to-clean areas of the pan. Using the manufacturing process described above, no gaps are formed between the side wall 114 and the rim 116 of the food pan 110 such that no food particles and/or liquids will get trapped in the reinforced band assembly 120 of the food pan 110. In some contemplated applications, the food pan 110 is carried to and from a cooking device (e.g., oven, baking rack) as necessary to refill the contents of the food pan 110 and to cook or serve food within the food pan 110. The food pan 110 may be slid into and out of a storage rack in between cooking and/or serving. In an exemplary embodiment, the rim 116 of the food pan 110 contacts the rack along the middle portion 144 (along a single point of contact) such that a minimal surface area of the food pan 110 is contacted by the rack and resulting frictional forces are reduced.

The construction and arrangements of the food pan, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A method for making a food pan, comprising:
   forming a pan comprising a bottom, a side wall extending along a perimeter of the bottom, wherein the side wall comprises an upper perimeter;
   forming a rim around the upper perimeter of the side wall, wherein the rim comprises a top portion and an outer edge;
   providing a reinforcement band proximate the upper perimeter of the side wall and the rim, the reinforcement band having a shape and comprising a metallic material;
   bending the rim around the reinforcement band and reforming the shape of the reinforcement band, wherein the outer edge of the rim contacts the side wall when fully shaped.

2. The method of claim 1, wherein the steps of bending the rim and reforming the reinforcement band comprise the step of coining the rim and reinforcement band to eliminate substantially all space between the reinforcement band and the rim.

3. The method of claim 1, further comprising bending the outer edge of the rim in a downward direction creating a vertical surface extending between the top portion and the outer edge.

4. The method of claim 3, wherein the vertical surface and the side wall define a gap.

5. The method of claim 4, further comprising inserting the reinforcement band into the gap.

6. The method of claim 5, further comprising curving the vertical surface of the rim toward the side wall wherein the outer edge engages the side wall creating an enclosed interior volume between the rim and the side wall.

7. The method of claim 6, wherein bending the rim does not deform the side wall or an interior surface of the food pan.

8. The method of claim 7, wherein the reinforcement band is completely enveloped by the rim such that the reinforcement band is sealed within the rim and against the side wall.

9. The method of claim 8, wherein when fully formed, there is no gap between the side wall, the rim, and the reinforcement band.

10. The method of claim 9, wherein the reinforcement band and the food pan are made from aluminum.

11. The method of claim 9, further comprising forming a point on an underside of the flange while bending the rim.

12. The method of claim 1, wherein a reformed shape of the reinforcement band is non-circular and non-rectangular.

13. A food pan, comprising:
   a bottom;
   a side wall extending along a perimeter of the bottom, wherein the side wall comprises an upper perimeter;
   a reinforcement band proximate the upper perimeter of the side wall, the reinforcement band comprising a metallic material; and
   a rim comprising a top side and an underside, wherein the rim extends from the side wall to an outer edge engaging the side wall to define an enclosed interior space;
   wherein the top side and the underside surround the reinforcement band within the enclosed interior space;
   wherein the outer edge engages the side wall to enclose the reinforcement band;
   wherein the reinforcement band comprises a shape transformed by a forging process to the rim and the reinforcement band;
   wherein the reinforcement band is enveloped by the rim such that the reinforcement band is sealed within the rim and against the side wall;
   wherein there is no gap between the rim, the side wall, and the reinforcement band within the enclosed interior space.

14. The food pan of claim 13, wherein the forging process comprises coining, swedging, or rolling.

15. The food pan of claim 13, wherein the underside comprises a point formed along the underside.

16. The food pan of claim 15, wherein the metallic material of the reinforcement band and a material of the food pan strengthen when the rim is enclosed around the reinforcement band and the outer edge engages the side wall.

17. The food pan of claim 13, wherein a reformed shape of the reinforcement band is non-circular and non-rectangular.

18. The food pan of claim 13, wherein the coining operation eliminates space between the reinforcement band and the rim.

19. The food pan of claim 16, wherein a modulus of elasticity of the metallic material comprises a range between 65 gigapascals (GPa) and 75 GPa, a tensile strength of at least 30,000 lb/in$^2$, and the metallic material is configured to withstand temperatures of up to 1200 degrees Fahrenheit.

20. The food pan of claim 19, wherein the reinforcement band and the food pan are made from aluminum.

* * * * *